United States Patent
Koizumi (10) Patent No.: US 12,511,075 B2
(45) Date of Patent: Dec. 30, 2025

(54) MEMORY SYSTEM

(71) Applicant: Kioxia Corporation, Tokyo (JP)

(72) Inventor: Shinya Koizumi, Kamakura Kanagawa (JP)

(73) Assignee: Kioxia Corporation, Tokyo (JP)

( * ) Notice: Subject to any disclaimer, the term of this patent is extended or adjusted under 35 U.S.C. 154(b) by 178 days.

(21) Appl. No.: 18/458,095

(22) Filed: Aug. 29, 2023

(65) Prior Publication Data

US 2024/0311047 A1    Sep. 19, 2024

(30) Foreign Application Priority Data

Mar. 16, 2023    (JP) .................................. 2023-041613

(51) Int. Cl.
    *G06F 3/06* (2006.01)
(52) U.S. Cl.
    CPC .......... *G06F 3/0658* (2013.01); *G06F 3/0614* (2013.01); *G06F 3/0679* (2013.01)
(58) Field of Classification Search
    CPC .... G06F 3/0658; G06F 3/0614; G06F 3/0679; G06F 3/061; G06F 3/0619
    USPC ....................................................... 365/193
    See application file for complete search history.

(56) References Cited

U.S. PATENT DOCUMENTS

| | | |
|---|---|---|
| 2018/0138907 A1 | 5/2018 | Yagi |
| 2019/0079882 A1* | 3/2019 | Kim ..................... G11C 29/52 |
| 2019/0392886 A1 | 12/2019 | Cox et al. |
| 2020/0174705 A1 | 6/2020 | Qawami et al. |
| 2020/0174706 A1 | 6/2020 | Venetsanopoulos et al. |
| 2021/0349660 A1 | 11/2021 | Kim et al. |

FOREIGN PATENT DOCUMENTS

WO    WO-2021049033 A1 *    3/2021 ......... G06F 12/0246

* cited by examiner

*Primary Examiner* — Fernando Hidalgo
(74) *Attorney, Agent, or Firm* — Kim & Stewart LLP (57) ABSTRACT

A memory system includes a nonvolatile memory and a controller electrically connected to the nonvolatile memory. The controller is configured to: after transmitting a write command and an address to the nonvolatile memory via a first signal line, transmit dummy data to the nonvolatile memory via the first signal line during at least a portion of a period that is between when the address is transmitted via the first signal line and when write data of the write command is transmitted via the first signal line, and after transmitting the dummy data via the first signal line, transmit a data strobe signal to the nonvolatile memory via a second signal line and transmit the write data of the write command to the nonvolatile memory via the first signal line in synchronization with the data strobe signal.

11 Claims, 9 Drawing Sheets

FIG. 5A  DQS (INPUT RECEIVER 150)

FIG. 5B  DQ [7:0] (INPUT RECEIVER 140)

FIG. 5C  DQS (LATCH 144)

FIG. 5D  DQ [7:0] (LATCH 144)

MEMORY SYSTEM

CROSS-REFERENCE TO RELATED APPLICATION(S)

This application is based upon and claims the benefit of priority from Japanese Patent Application No. 2023-041613, filed Mar. 16, 2023, the entire contents of which are incorporated herein by reference.

FIELD

Embodiments described herein relate generally to memory systems.

BACKGROUND

A solid state drive (hereinafter referred to as an SSD) is known as an example of a memory system that uses a nonvolatile memory. The SSD includes the nonvolatile memory (for example, a NAND flash memory) and a memory controller. The memory controller transmits commands (and addresses) and data to the nonvolatile memory via I/O signal lines. The memory controller transmits data strobe signals to the nonvolatile memory via signal lines other than the I/O signal lines. The nonvolatile memory fetches data in a period of a predetermined width centered around a rising timing of the data strobe signal.

The waveform of the data strobe signal may be distorted during transmission. When the rising timing of the data strobe signal deviates from the predetermined timing due to the distortion of the waveform, the nonvolatile memory may not be able to fetch data correctly.

DETAILED DESCRIPTION

Embodiments provide memory systems in which a nonvolatile memory has implemented improvements to fetch data correctly.

In general, according to one embodiment, a memory system includes a nonvolatile memory and a controller electrically connected to the nonvolatile memory with at least first and second signal lines. The controller is configured to: after transmitting a write command and an address to the nonvolatile memory via the first signal line, transmit dummy data to the nonvolatile memory via the first signal line during at least a portion of a period that is between when the address is transmitted via the first signal line and when write data of the write command is transmitted via the first signal line, and after transmitting the dummy data via the first signal line, transmit a data strobe signal to the nonvolatile memory via the second signal line and transmit the write data of the write command to the nonvolatile memory via the first signal line in synchronization with the data strobe signal.

Embodiments will be described below with reference to the drawings. The following description exemplifies devices and methods for embodying the technical idea of the embodiment, and the technical idea of the embodiment is not limited to the structure, shape, arrangement, material, and the like of the components described below. Modifications that can be conceived by those skilled in the art are naturally provided in the scope of the disclosure. In some cases, to clarify the description, in the drawings, the size, thickness, planar dimensions, shape, and the like of each element may be changed from the actual ones to be schematically illustrated. A plurality of drawings may include elements having different dimensional relationships and ratios to each other. In some cases, in a plurality of drawings, corresponding elements are denoted by the same reference numerals, and duplicate descriptions may be omitted. Some elements are denoted by a plurality of names but they are merely examples, and those elements may be denoted by still other names. Some other elements which are not denoted by a plurality of names may be denoted by other names. In the following description, "connection" may include not only direct connection but also connection via other elements.

Hereinafter, embodiments will be described in detail with reference to the drawings.

First Embodiment

Figure 1:
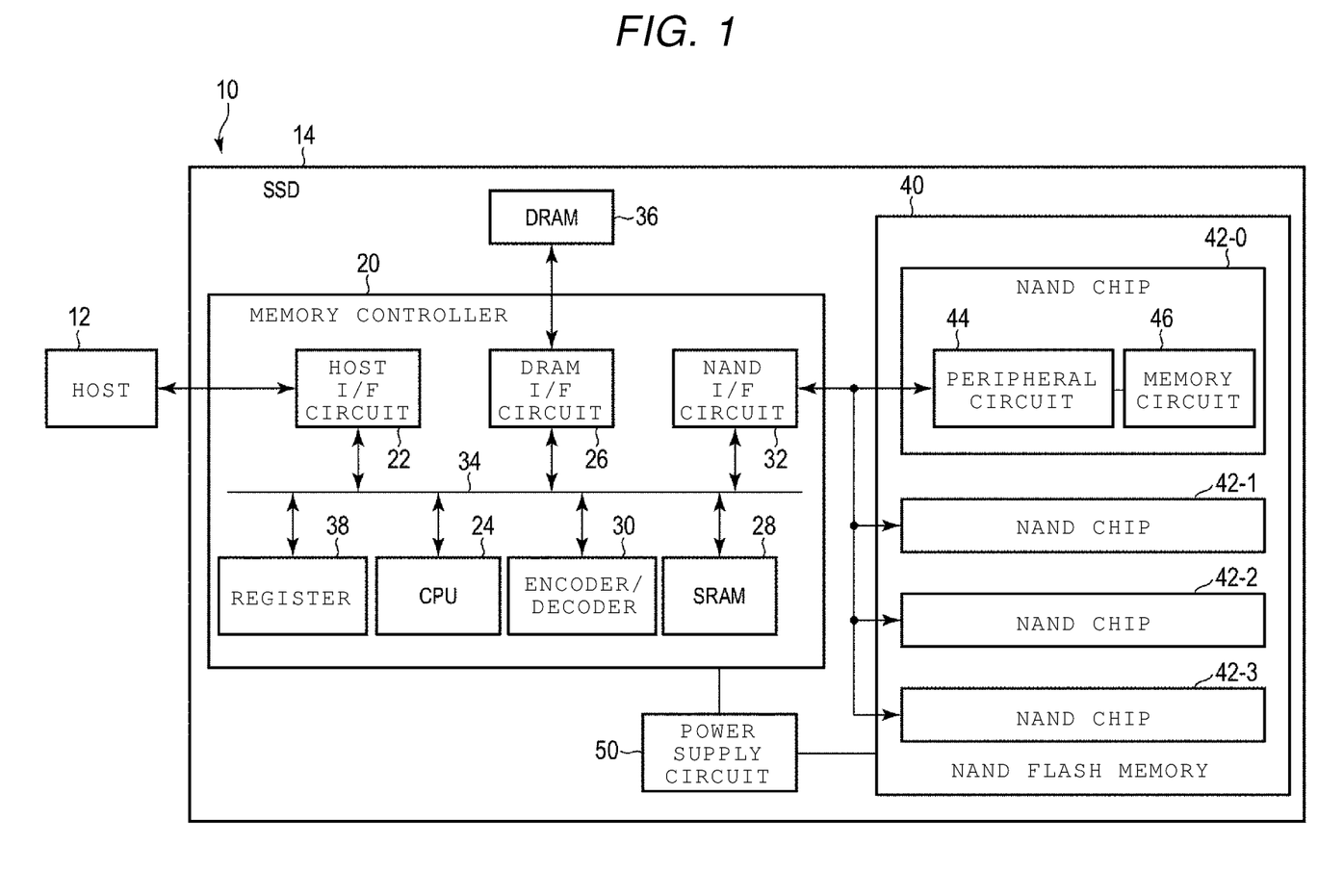
FIG. 1 is a diagram illustrating an example of an information processing system including a memory system according to a first embodiment.

FIG. 1 is a diagram illustrating an example of an information processing system including a memory system according to a first embodiment. An information processing system 10 includes a host 12 and a memory system 14. The memory system 14 is, for example, an SSD. In the following description, the memory system 14 is referred to as an SSD 14.

The host 12 is an information processing device configured to control the SSD 14. Examples of the host 12 are personal computers, server computers, mobile terminals, and in-vehicle devices.

The SSD 14 may be connected to the host 12 via a cable or network, or may be built in the host 12. The SSD 14 includes a memory controller 20, a nonvolatile memory 40 and a power supply circuit 50.

An example of the nonvolatile memory 40 is a NAND flash memory. The nonvolatile memory 40 is not limited to the NAND flash memory, and may be a NOR flash memory or other types of nonvolatile memory. The nonvolatile memory 40 may be a memory with a two-dimensional structure or may be a memory with a three-dimensional structure. In the following description, the nonvolatile memory 40 is referred to as a NAND flash memory 40.

The NAND flash memory 40 may include a plurality of memory chips. In the following description, the memory chip is referred to as a NAND chip. For example, the NAND flash memory 40 includes four NAND chips 42-0 to 42-3. The NAND chips 42-0 to 42-3 are referred to as a NAND chip 42 when there is no need to distinguish between the chips. The NAND chip 42 includes a peripheral circuit 44 and a memory circuit 46.

The SSD 14 may further include a random access memory, such as a dynamic random access memory (DRAM) 36. The DRAM 36 functions as a buffer for data transfer between the host 12 and the NAND flash memory 40. A portion of a storage area of the DRAM 36 may be used as a write buffer, a read buffer, and a command buffer. The write buffer temporarily stores data to be written to the NAND flash memory 40. The read buffer temporarily stores data read from the NAND flash memory 40. The command buffer temporarily stores commands received from the host 12 until the commands are executed.

The memory controller 20 may be implemented with a circuit such as a system-on-a-chip (SoC). The functions of each component of the memory controller 20 may be implemented with a dedicated hardware circuit, a processor executing a program (firmware), or a combination thereof.

The memory controller 20 includes a host interface (host I/F) circuit 22, a CPU 24, a DRAM interface (DRAM I/F) circuit 26, a static RAM (SRAM) 28, an encoder/decoder 30, a NAND interface (NAND I/F) circuit 32, and a register 38. The host I/F circuit 22, the CPU 24, the DRAM I/F circuit 26, the SRAM 28, the encoder/decoder 30, the NAND I/F circuit 32, and the register 38 are interconnected via a bus 34. Some of the components may be disposed outside the memory controller 20.

The NAND I/F circuit 32 is electrically connected to the NAND flash memory 40. The NAND I/F circuit 32 is a controller configured to control the NAND flash memory 40 under the control of the CPU 24. The NAND I/F circuit 32 is also referred to as a NAND controller. A toggle interface is known as an example of an interface between the memory controller 20 and the NAND flash memory 40.

Commands, addresses, and data are transferred in the toggle interface by using I/O signal lines. That is, the I/O signal line is shared for command transfer, address transfer, and data transfer. Therefore, while the data is being transferred between the memory controller 20 and the NAND flash memory 40, the command or the address cannot be transferred. Similarly, the data cannot be transferred while the command or the address is being transferred.

The host I/F circuit 22 communicates with the host 12. The host I/F circuit 22 communicates with the host 12 in a protocol according to, for example, serial ATA (SATA), serial attached SCSI (SAS), PCI Express® (PCIe), and Ethernet®. The host I/F circuit 22 receives various commands and data such as write commands, user data, and read commands from the host 12.

The DRAM I/F circuit 26 is an interface circuit configured to control the DRAM 36 under the control of the CPU 24. The DRAM I/F circuit 26 is also referred to as a DRAM controller.

The SRAM 28 is used, for example, as a work area for the CPU 24.

The encoder/decoder 30 encodes and decodes the data for error detection and error correction in the data read from the NAND flash memory 40. The encoder/decoder 30 encodes the data to be written (write data) to the NAND flash memory 40 (more specifically, to a memory cell array 120 described later). The encoder/decoder 30 decodes the data read (read data) from the NAND flash memory 40. During decoding, the encoder/decoder 30 performs error detection and the error correction on the read data.

The register 38 stores, for example, dummy data. The CPU 24 can write any dummy data to the register 38. It should be noted that the register 38 may be omitted, and a portion of the memory area of the SRAM 28, the DRAM 36, or a memory in the CPU 24 may store the dummy data. The dummy data is data that is not to be written to the NAND flash memory 40 (more specifically, to the memory cell array 120 described later).

The CPU 24 is a processor configured to control the host I/F circuit 22, the DRAM I/F circuit 26, the SRAM 28, the encoder/decoder 30, the NAND I/F circuit 32, and the register 38. In response to the boot-up of the SSD 14, the CPU 24 loads a control program (referred to as firmware) from the NAND flash memory 40 or a ROM (not illustrated) into the SRAM 28 and performs various processes by executing the firmware.

The power supply circuit 50 supplies power to each component of the SSD 14 by using power supplied from an external device (for example, the host 12) connected to the SSD 14.

Figure 2:
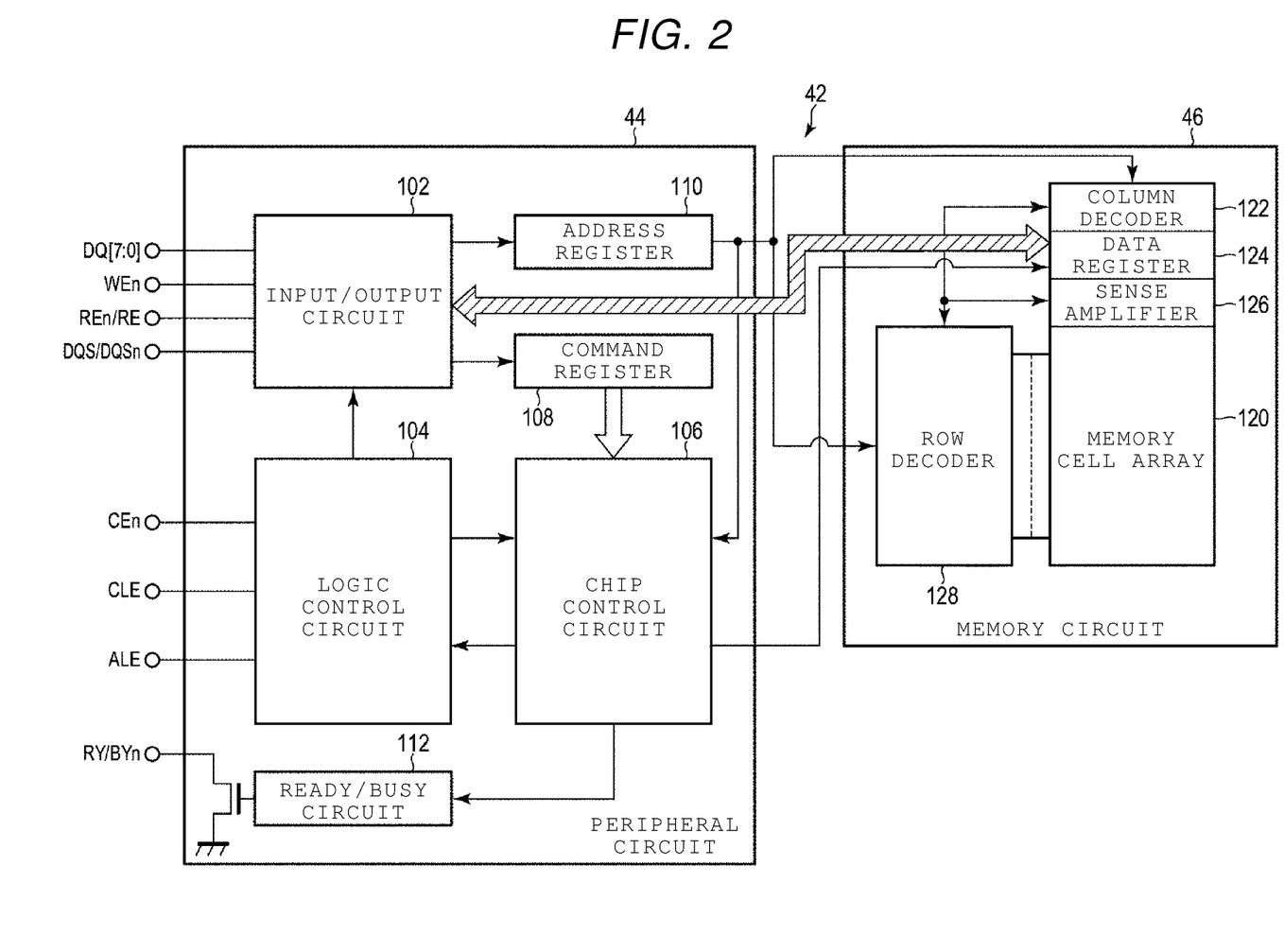
FIG. 2 is a diagram illustrating an example of a configuration of a NAND chip according to the first embodiment.

FIG. 2 is a diagram illustrating an example of the configuration of the NAND chip 42 according to the first embodiment. The peripheral circuit 44 includes an input/output circuit 102, a logic control circuit 104, a chip control circuit 106, a command register 108, an address register 110, and a ready/busy circuit 112. The memory circuit 46 includes a memory cell array 120, a column decoder 122, a data register 124, a sense amplifier 126, and a row decoder 128.

The signal lines connecting the NAND chip 42 and the NAND I/F circuit 32 include I/O signal lines DQ[7:0] for transferring I/O signals and control signal lines for transferring control signals.

The I/O signal lines DQ[7:0] include eight signal lines, each transferring a 1-bit I/O signal DQ. The I/O signal DQ includes commands, addresses, and data. That is, the I/O signal lines DQ[7:0] transfer 8-bit width commands, 8-bit width addresses, and 8-bit width data. The bit width of signals transferred by the I/O signal lines is, however, not limited to 8-bit width.

The control signal lines include a chip enable signal line CEn, a command latch enable signal line CLE, an address latch enable signal line ALE, a write enable signal line WEn, a pair of read enable signal lines REn/RE, and a pair of data strobe signal lines DQS/DQSn, and a ready/busy signal line RY/BYn. Each control signal line transfers a 1-bit control signal.

The "n" attached to the end of the name of each signal line indicates that a signal transferred by the signal line is a low-active signal. In the following description, a signal at a valid level is referred to as "a signal is asserted". A signal at an invalid level is referred to as "a signal is deasserted". A high active signal is asserted at a high level and deasserted at a low level. A low-active signal is deasserted at a high level and asserted at a low level.

The chip enable signal line CEn, the command latch enable signal line CLE, and the address latch enable signal line ALE are connected to the logic control circuit 104. The I/O signal lines DQ[7:0], the write enable signal line WEn, the read enable signal lines REn/RE, and the data strobe signal lines DQS/DQSn are connected to the input/output circuit 102. The ready/busy signal line RY/BYn is connected to the ready/busy circuit 112.

The chip enable signal line CEn transfers a chip enable signal CEn. The chip enable signal CEn is a signal for allowing the NAND chip 42 that is an access target to enter an enabled state.

The command latch enable signal line CLE transfers a command latch enable signal CLE. The command latch enable signal CLE indicates that a signal transferred by using the I/O signal lines DQ[7:0] is a command.

The address latch enable signal line ALE transfers an address latch enable signal ALE. The address latch enable signal ALE indicates that a signal transferred by using the I/O signal lines DQ[7:0] is an address.

The write enable signal line WEn transfers a write enable signal WEn. The write enable signal WEn is a data strobe signal indicating a timing of fetching the command or the address transferred by using the I/O signal lines DQ[7:0].

The ready/busy signal line RY/BYn transfers a ready/busy signal RY/BYn. The ready/busy signal RY/BYn indicates whether the NAND chip 42 is ready or busy.

A pair of the read enable signal lines REn/RE transfers a pair of read enable signals REn/RE. A pair of the read enable signals REn/RE are configured as differential signals. A pair of the read enable signals REn/RE are timing signals with which the memory controller 20 instructs output timing of data, to the NAND chip 42. Hereinafter, when describing the pair of the read enable signals REn/RE, only the read enable signal REn will be referred to, and the reference to the read enable signal RE will be omitted.

A pair of the data strobe signal lines DQS/DQSn transfers a pair of data strobe signals DQS/DQSn. A pair of the data strobe signals DQS/DQSn is configured as differential signals. A pair of the data strobe signals DQS/DQSn instructs data fetch timing to the transfer destination during data transfer. During a write operation, the memory controller 20 (more specifically, the NAND I/F circuit 32) transmits the pair of the data strobe signals DQS/DQSn. That is, in the write operation, the data is transferred by using the I/O signal lines DQ[7:0] in synchronization with the pair of the data strobe signals DQS/DQSn transmitted by the memory controller 20. During a read operation, the NAND chip 42 (more specifically, the peripheral circuit 44) transmits the pair of the data strobe signals DQS/DQSn. That is, in the read operation, the data is transferred by using the I/O signal lines DQ[7:0] in synchronization with the pair of the data strobe signals DQS/DQSn transmitted by the NAND chip 42. Hereinafter, when describing the pair of data strobe signals DQS/DQSn, only the data strobe signal DQS will be referred to, and the reference to the data strobe signal DQSn will be omitted.

The input/output circuit 102 is a buffer circuit for transmitting/receiving the I/O signals to/from the NAND I/F circuit 32. The input/output circuit 102 latches the I/O signals. Commands, addresses, and data latched by the input/output circuit 102 are distributed to and stored in the command register 108, the address register 110, and the data register 124, respectively.

The addresses stored in the address register 110 include chip numbers, row addresses, and column addresses. The chip number is identification information for distinguishing the NAND chips 42-0, 42-1, 42-2, and 42-3. The chip number is supplied to the chip control circuit 106, the row address is supplied to the row decoder 128, and the column address is supplied to the column decoder 122. Note that the address may not include the chip number. In this case, the address space may be different for each chip, and the address may contain information that can identify the chip.

The logic control circuit 104 receives an input of the control signal. Based on the received control signal, the logic control circuit 104 determines registers to store the I/O signals received by the input/output circuit 102. The logic control circuit 104 transfers the received control signal to the chip control circuit 106.

The chip control circuit 106 is a circuit that transitions between states based on various control signals received via the logic control circuit 104 and the commands stored in the command register 108. The chip control circuit 106 controls the operation of each NAND chip 42.

The ready/busy circuit 112 transitions the state of the ready/busy signal RY/BYn between a ready state and a busy state under the control of the chip control circuit 106.

The memory cell array 120 of the NAND chip 42 includes a plurality of blocks. Each block includes a plurality of pages. Each page includes a plurality of memory cells connected to the same word line. The block is a unit of a data erase operation for erasing data from the NAND flash memory 40. The page is a unit of a data write operation and a data read operation.

The column decoder 122 and the row decoder 128 designate the memory cells of the memory cell array 120 according to the column address and the row address. During a write operation, the data in the data register 124 is written to the memory cells designated by the column decoder 122 and the row decoder 128. During a read operation, the sense amplifier reads the data from the memory cells designated by the column decoder 122 and the row decoder 128. The read data is written to the data register 124.

Next, an overview of the toggle interface between the memory controller 20 (more specifically, the NAND I/F circuit 32) and the NAND chip 42 (more specifically, the peripheral circuit 44) will be described.

Figure 3:
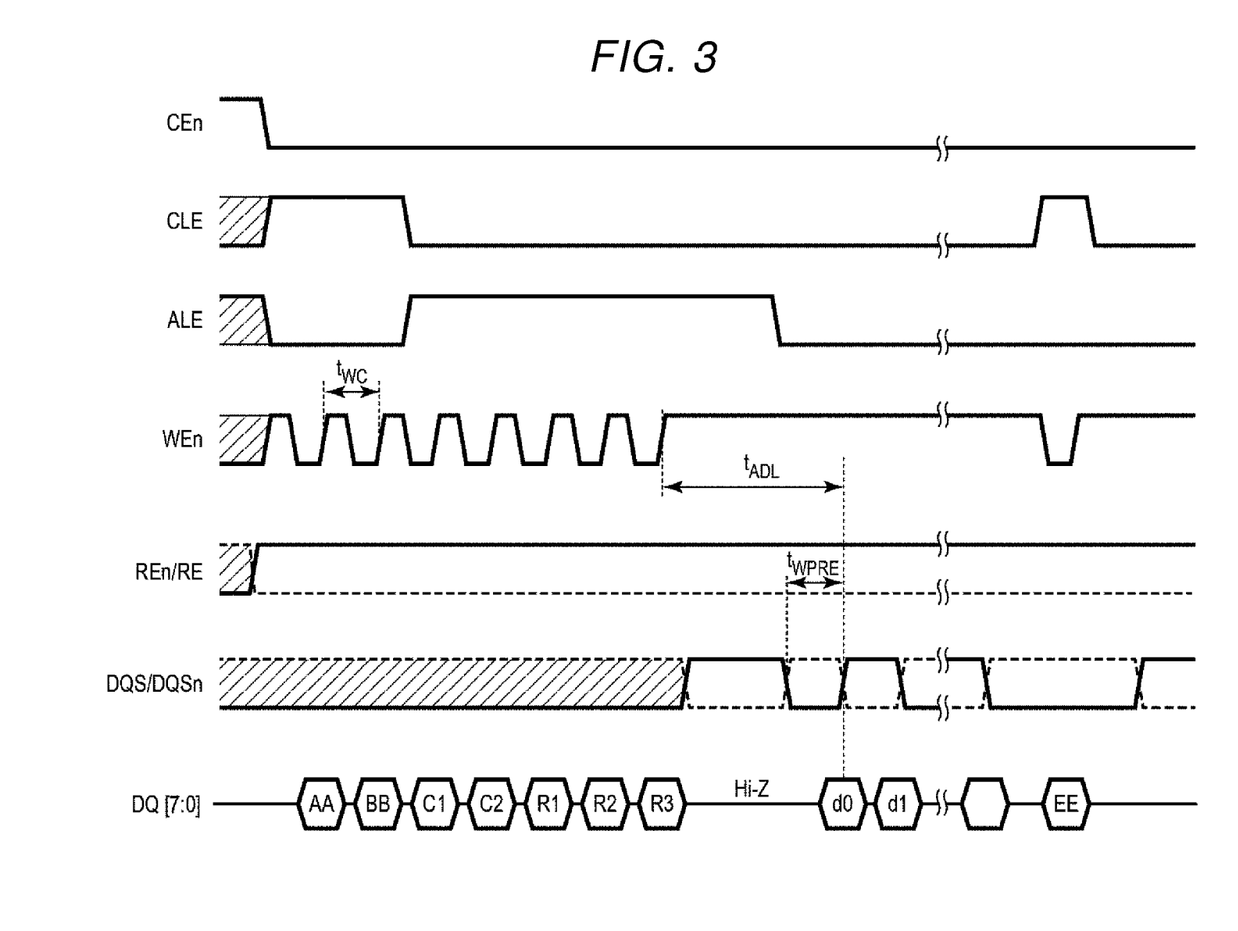
FIG. 3 is a diagram illustrating an example of signal waveforms during a write operation according to the first embodiment.

FIG. 3 is a diagram illustrating an example of the signal waveforms during the write operation according to the first embodiment. In the initial state, the chip enable signal CEn is deasserted, the I/O signal lines DQ[7:0] are in a high impedance (Hi-Z) state, and the states of other signal lines are irrelevant. The oblique lines in FIG. 3 indicate an irrelevant state.

The NAND I/F circuit 32 asserts the chip enable signal CEn and the command latch enable signal CLE, deasserts the address latch enable signal ALE, deasserts the read enable signal REn, and starts toggling the write enable signal WEn. The level of the write enable signal WEn becomes a low level and a high level periodically. The toggling cycle of the write enable signal WEn is $t_{WC}$.

The NAND I/F circuit 32 sequentially transfers commands AA and BB to the NAND chip 42 by using the I/O signal lines DQ[7:0] in synchronization with the rising edge of the write enable signal WEn. The input/output circuit 102 sequentially latches the commands AA and BB sequentially input by using the I/O signal lines DQ[7:0] in synchronization with the rising edge of the write enable signal WEn. The latched command is transferred to the command register 108.

After transferring the command BB, the NAND I/F circuit 32 deasserts the command latch enable signal CLE and asserts the address latch enable signal ALE.

The NAND I/F circuit 32 sequentially transfers two cycles of column addresses C1 and C2 and three cycles of row addresses R1, R2, and R3 to the NAND chip 42 by using the I/O signal lines DQ[7:0] in synchronization with the rising edge of the write enable signal WEn. The input/output circuit 102 sequentially latches the column addresses C1 and C2, and the row addresses R1, R2, and R3 sequentially input by using the I/O signal lines DQ[7:0] in synchronization with the rising edge of the write enable signal WEn. The latched addresses are transferred to the address register 110.

After transferring the row address R3, the NAND I/F circuit 32 stops the toggling of the write enable signal WEn by maintaining the write enable signal WEn at a high level.

After transferring the row address R3, the NAND I/F circuit 32 also maintains the data strobe signal DQS at a high level.

The NAND I/F circuit 32 deasserts the address latch enable signal ALE while the data strobe signal DQS is maintained at a high level.

After deasserting the address latch enable signal ALE, the NAND I/F circuit 32 maintains the data strobe signal DQS at a low level.

After a write preamble period $t_{WPRE}$ has passed after starting to maintain the data strobe signal DQS at a low level, the NAND I/F circuit 32 starts toggling the data strobe signal DQS. The NAND I/F circuit 32 sequentially transfers write data d0, d1 . . . to the NAND chip 42 by using the I/O signal lines DQ[7:0] in synchronization with both rising and falling edges of the data strobe signal DQS. The input/output circuit 102 of the NAND chip 42 sequentially latches the write data sequentially input by using the I/O signal line DQ[7:0] in synchronization with both rising and falling edges of the data strobe signal DQS. The latched write data is transferred to the data register 124.

A period from stop of toggling of the write enable signal WEn to start of toggling of the data strobe signal DQS is referred to as $t_{ADL}$ (address to data loading time).

After the transfer of the write data is completed, the NAND I/F circuit 32 stops toggling the data strobe signal DQS.

After a certain period of time has elapsed after stopping the toggling of the data strobe signal DQS, the NAND I/F circuit 32 asserts the command latch enable signal CLE and toggles the write enable signal WEn only once.

The NAND I/F circuit 32 transfers a command EE to the NAND chip 42 by using the I/O signal lines DQ[7:0] in synchronization with the rising edge of the write enable signal WEn. The command EE instructs start of a data write operation from the data register 124 to the memory cell array 120.

The input/output circuit 102 latches the command EE input by using the I/O signal lines DQ[7:0] in synchronization with the rising edge of the write enable signal WEn.

After a certain period of time has passed after falling of the write enable signal WEn, the NAND I/F circuit 32 maintains the data strobe signal DQS at a high level.

As the toggle interface between the memory controller 20 and the NAND flash memory 40, a matched DQS type toggle interface or an unmatched DQS type toggle interface is used.

In the matched DQS type toggle interface, the data strobe signal DQS and the I/O signal DQ input to the input/output circuit 102 are latched via respective delay circuits having the same delay time.

In the unmatched DQS type toggle interface, the data strobe signal DQS input to the input/output circuit 102 is latched via the delay circuit, but the I/O signal DQ is latched without the delay circuit.

Figure 4:
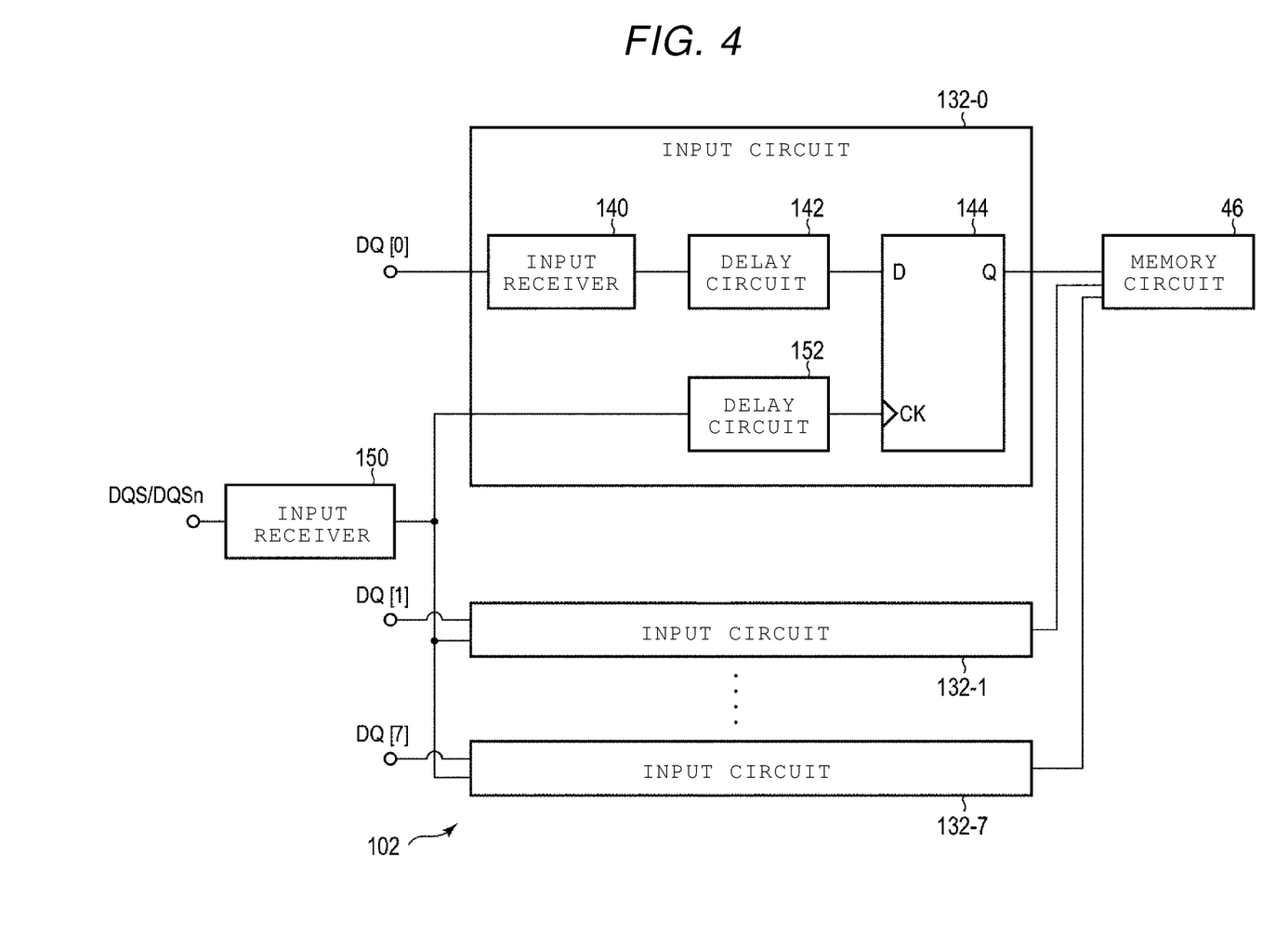
FIG. 4 is a circuit diagram illustrating an example of an input circuit according to the first embodiment.

FIG. 4 is a circuit diagram illustrating an example of the input/output circuit 102 according to the first embodiment. FIG. 4 illustrates an example of the input/output circuit 102 when the matched DQS type toggle interface is employed. The input/output circuit 102 includes an input receiver 150 and eight input circuits 132-0 to 132-7. The input circuits 132-0 to 132-7 are referred to as an input circuit 132 when there is no need to distinguish between the input circuits. The input circuit 132 is provided for each I/O signal line DQ. The data strobe signal line DQS is connected to the input receiver 150. The output of the input receiver 150 is commonly connected to the eight input circuits 132-0 to 132-7. The input circuit 132 includes an input receiver 140, delay circuits 142 and 152, and a latch 144. An example of each of the delay circuits 142 and 152 is serially-connected buffer amplifiers and/or inverters. An example of the latch 144 is a D-type flip-flop.

One of the I/O signal lines DQ is connected to the input receiver 140. The output signal of the input receiver 140 is input to the input terminal D of the latch 144 via the delay circuit 142. The output signal of the input receiver 150 is input to the clock terminal CK of the latch 144 via the delay circuit 152.

The output signal of the latch 144 is input to the data register 124 of the memory circuit 46.

FIGS. 5A to 5D are waveform diagrams illustrating an operation example of the input circuit 132 according to the first embodiment.

Figure 5A:
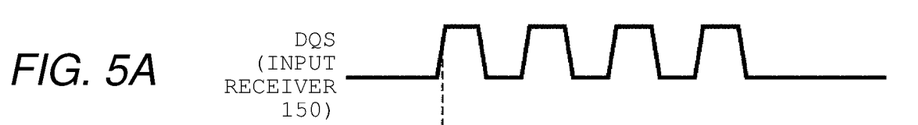
FIGS. 5A to 5D are waveform diagrams illustrating an operation example of the input circuit according to the first embodiment.
Figure 5B:
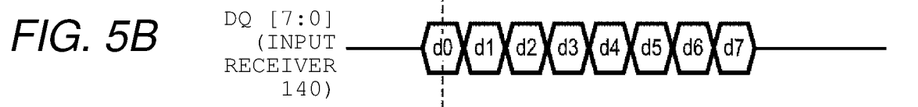
Figure 5C:
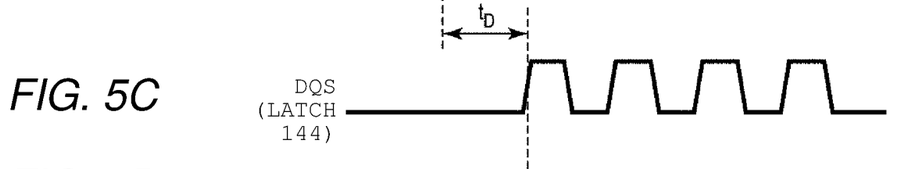
Figure 5D:
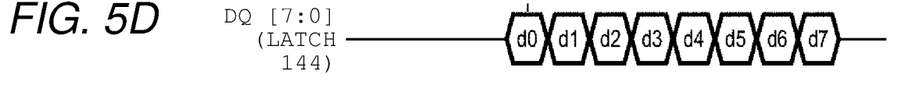

FIG. 5A illustrates a waveform of the data strobe signal DQS input to the input receiver 150. FIG. 5B illustrates a waveform of the I/O signal DQ input to the input receiver 140. FIG. 5C illustrates a waveform of the data strobe signal DQS input to the clock terminal CK of the latch 144. FIG. 5D illustrates a waveform of the I/O signal DQ input to the input terminal D of the latch 144.

When transferring the write data, the NAND I/F circuit 32 toggles the data strobe signal DQS. The NAND I/F circuit 32 outputs the write data d0, d1 . . . to the I/O signal lines DQ[7:0] in synchronization with both rising and falling edges of the data strobe signal DQS.

As illustrated in FIGS. 5A and 5B, the data strobe signal DQS and the I/O signal DQ are simultaneously input to the input receivers 150 and 140, respectively. The data strobe signal DQS and the I/O signal DQ output from the input receivers 150 and 140, respectively, are input to the latch 144 via the delay circuits 152 and 142, respectively. Herein, it is assumed that the delay durations of the delay circuits 152 and 142 are equal to each other ($t_D$). Therefore, as illustrated in FIGS. 5C and 5D, the data strobe signal DQS and the I/O signal DQ are simultaneously input to the clock terminal CK and the input terminal D, respectively, of the latch 144 after the delay duration $t_D$.

The circuits are designed so that the delay durations of the delay circuit 142 of the eight input circuits 132-0 to 132-7 are equal to each other. However, in some cases, the delay duration for each bit of the I/O signal DQ[7:0] may deviate from a design value. In this case, skew occurs between the 8-bit I/O signals DQ[7:0], and thus, there is a possibility that the latch 144 may not be able to latch the data correctly.

To prevent such skews, the unmatched DQS type toggle interface has been developed.

Figure 6:
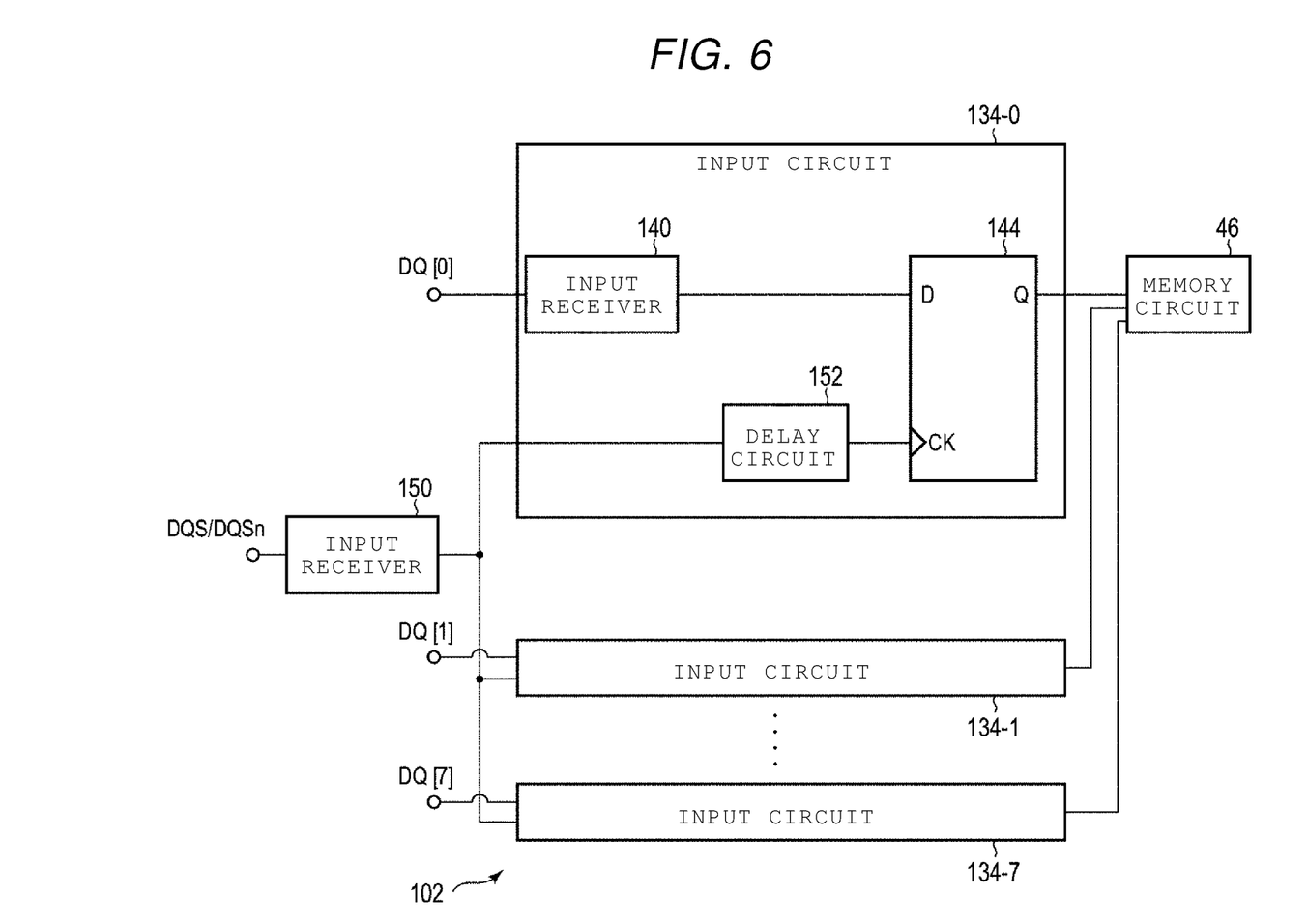
FIG. 6 is a circuit diagram illustrating another example of the input circuit according to the first embodiment.

FIG. 6 is a circuit diagram illustrating another example of the input/output circuit 102 according to the first embodiment. FIG. 6 illustrates an example of the input/output circuit 102 when the unmatched DQS type toggle interface is employed. The input/output circuit 102 includes the input receiver 150 and the eight input circuits 134-0 to 134-7. The input circuits 134-0 to 134-7 are referred to as an input circuit 134 when there is no need to distinguish between the circuits. The input circuit 134 is provided for each I/O signal line DQ. The data strobe signal line DQS is connected to the input receiver 150. The output of the input receiver 150 is commonly connected to the eight input circuits 134-0 to 134-7. The input circuit 134 is different from the input circuit 132 of the matched DQS type in that the delay circuit 142 is not connected between the input receiver 140 and the latch 144. The output signal of the input receiver 140 is input to the input terminal D of the latch 144 as it is.

FIGS. 7A to 7D are waveform diagrams illustrating an operation example of the input circuit 134 according to the first embodiment.

Figure 7A:
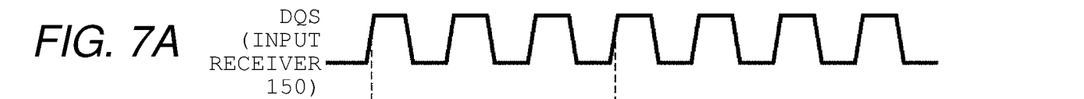
FIGS. 7A to 7D are waveform diagrams illustrating another operation example of the input circuit according to the first embodiment.
Figure 7B:
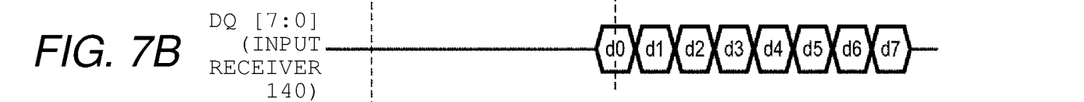
Figure 7C:
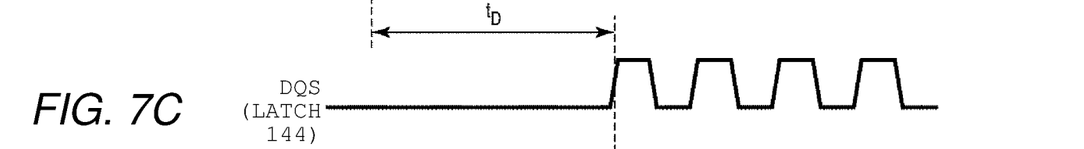
Figure 7D:
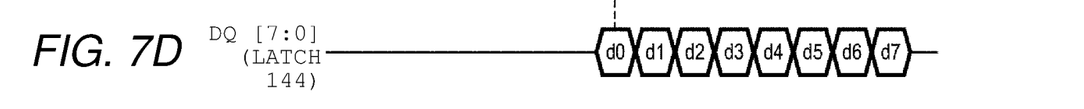

FIG. 7A illustrates a waveform of the data strobe signal DQS input to the input receiver 150. FIG. 7B illustrates a waveform of the I/O signal DQ input to the input receiver 140. FIG. 7C illustrates a waveform of the data strobe signal DQS input to the clock terminal CK of the latch 144. FIG. 7D illustrates a waveform of the I/O signal DQ input to the input terminal D of the latch 144.

When transferring the write data, the NAND I/F circuit 32 toggles the data strobe signal DQS. After the delay duration $t_D$ from start of the toggling of the data strobe signal DQS, the NAND I/F circuit 32 outputs the write data d0, d1 . . . to the I/O signal lines DQ[7:0]. The NAND I/F circuit 32 outputs the write data d0, d1 . . . to the I/O signal lines DQ[7:0] in synchronization with both rising and falling edges of the data strobe signal DQS.

As illustrated in FIGS. 7A and 7B, the data strobe signal DQS is input to the input receiver 150 faster by duration $t_D$ than the I/O signal DQ being input to the input receiver 140. The data strobe signal DQS output from the input receiver 150 is input to the latch 144 via the delay circuit 152. Herein, it is assumed that the delay duration of the delay circuit 152 is duration tp. Meanwhile, the I/O signal DQ output from the input receiver 140 is input to the latch 144 without passing through the delay circuit. Therefore, as illustrated in FIGS. 7C and 7D, the data strobe signal DQS and the I/O signal DQ are simultaneously input to the clock terminal CK and the input terminal D of the latch 144, respectively.

In each of the eight input circuits 134-0 to 134-7 employing the unmatched DQS type, the timing at which the data strobe signal DQS and the I/O signal DQ reach the latch 144 is adjusted only by the delay circuit 152. That is, the I/O signal DQ is not delayed in the input circuit 134. Therefore, skew is less likely to occur between the 8-bit I/O signals DQ[7:0], and the latch 144 can latch the data correctly.

Another cause of timing deviation between the I/O signal DQ and the data strobe signal DQS is, for example, temperature and power supply voltage of the SSD 14.

In some cases, when the temperature of the SSD 14 changes, the delay durations of the delay circuits 142 and 152 may change. For example, as the temperature changes, the delay durations of the delay circuits 142 and 152 may change from the duration $t_D$.

When the unmatched DQS type toggle interface is employed, after the delay duration $t_D$ from the start of the toggling of the data strobe signal DQS, the NAND I/F circuit 32 outputs the write data d0, d1 . . . to the I/O signal lines DQ[7:0]. When the delay duration of the delay circuit 152 changes from the duration $t_D$, however, the data strobe signal DQS and the I/O signal DQ are not simultaneously input to the clock terminal CK and the input terminal D of the latch 144 of the input circuit 134.

When the matched DQS type toggle interface is employed, the I/O signal DQ and the data strobe signal DQS are simultaneously input to the input receivers 140 and 150, respectively. When the delay durations of the delay circuits 142 and 152 change, however, the data strobe signal DQS and the I/O signal DQ are not simultaneously input to the clock terminal CK and the input terminal D of the latch 144 of the input circuit 132.

Since the temperature of the SSD 14 changes over a relatively long period of time about several seconds, the input timings of the data strobe signal DQS and the I/O signal DQ to the latch 144 can be adjusted, for example, by training the SSD 14 during operation. The training takes, for example, about several microseconds to several milliseconds. For example, by changing the timing at which the NAND I/F circuit 32 outputs the data strobe signal DQS, the timing deviation between the data strobe signal DQS and the I/O signal DQ due to the temperature change can be compensated for.

The power supply voltage of the SSD 14 drops, for example, when the NAND I/F circuit 32 transmits the I/O signal DQ or the control signal.

Figure 8A:
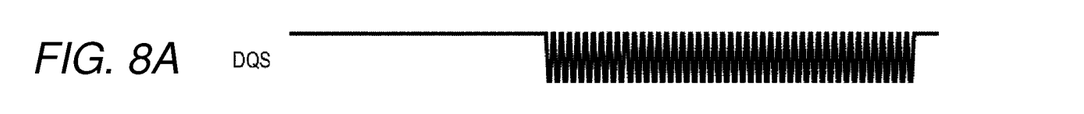
FIGS. 8A to 8C are diagrams illustrating an example in which a power supply voltage drops due to transmission of a signal from a NAND interface circuit according to the first embodiment.
Figure 8B:
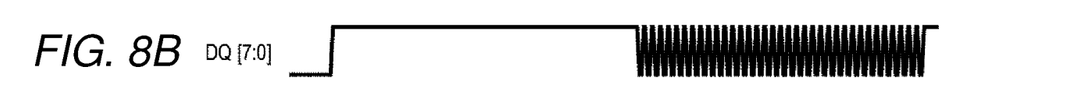
Figure 8C:
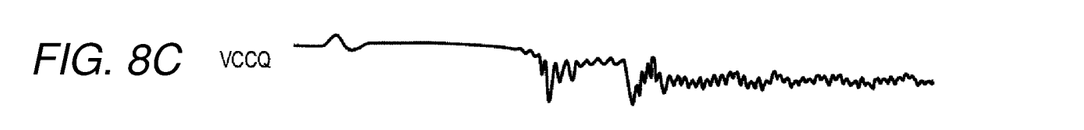

FIGS. 8A to 8C are diagrams illustrating an example in which the power supply voltage drops due to the transmission of the I/O signal DQ and the control signal from the NAND I/F circuit 32. FIGS. 8A to 8C illustrate an example in which the unmatched DQS type toggle interface is employed as the interface between the memory controller 20 and the NAND flash memory 40. FIG. 8A illustrates an example of a waveform of the data strobe signal DQS at the input terminal of the input circuit 134. FIG. 8B illustrates an example of a waveform of the I/O signal DQ at the input terminal of the input circuit 134. FIG. 8C illustrates an example of a power supply voltage VCCQ output by the power supply circuit 50. The power supply voltage VCCQ is a power supply voltage for the NAND I/F circuit 32 to transmit the I/O signal DQ and the control signal.

When the data strobe signal DQS starts to toggle, the power supply voltage VCCQ drops. Next, the power supply voltage VCCQ fluctuates due to the toggling of the data strobe signal DQS. When the data transfer via the I/O signal lines DQ[7:0] starts, the power supply voltage VCCQ further drops. The amount of decrease in the power supply voltage VCCQ is greatest immediately after (for example, about several nanoseconds) the start of the data transfer via the I/O signal lines DQ[7:0], and after that, the amount of decrease in the power supply voltage decreases. The drop in the power supply voltage VCCQ is caused by, for example, an ohmic drop (IR drop).

FIGS. 8A to 8C illustrate an example of the unmatched DQS type toggle interface, but the power supply voltage VCCQ similarly drops when the matched DQS type toggle interface is employed.

When the power supply voltage VCCQ drops, driving capability of the NAND I/F circuit 32 drops, and signal quality of the I/O signal DQ and the control signal deteriorates. Specifically, levels and pulse widths of the I/O signal DQ and the control signals change. As a result, the latch 144 may not be able to fetch the data accurately.

The power supply voltage VCCQ changes in a relatively short period of about several nanoseconds. Such a short period makes it difficult (or, impossible) to adjust the timing deviation between the data strobe signal DQS and the I/O signal DQ by training.

Figure 9A:
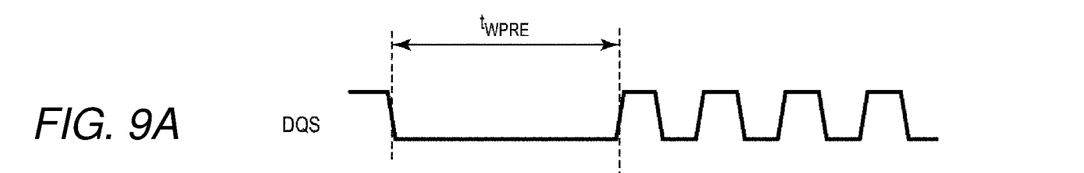
FIGS. 9A to 9C are diagrams illustrating an example of the operation of the NAND interface circuit according to the first embodiment.
Figure 9B:
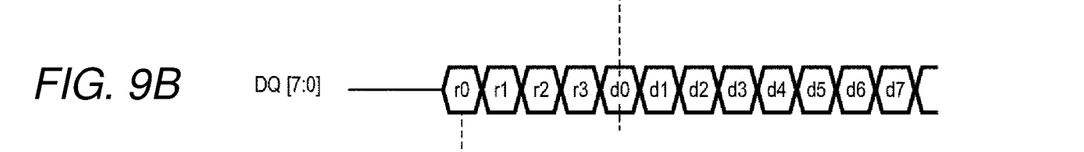
Figure 9C:
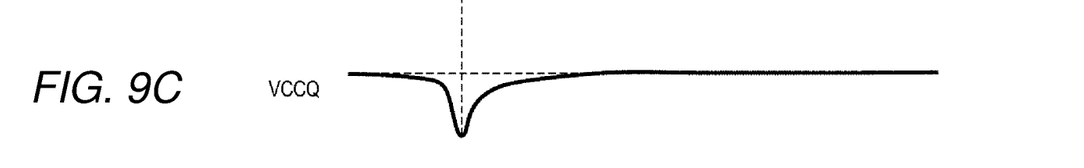

The first embodiment prevents the timing deviation between the data strobe signal DQS and the I/O signal DQ due to the drop in the power supply voltage. FIGS. 9A to 9C are diagrams illustrating an example of the operation of the NAND I/F circuit 32 according to the first embodiment. Waveforms of signals other than the data strobe signal DQS, the I/O signal DQ[7:0], and the power supply voltage VCCQ are omitted in FIGS. 9A to 9C.

Before the NAND I/F circuit 32 transmits the write data d0, d1 . . . to the NAND chip 42 (more specifically, to the input/output circuit 102) by using the I/O signal lines DQ[7:0], the NAND I/F circuit 32 transmits dummy data r0, r1, r2, and r3 to the NAND chip 42 by using the I/O signal lines DQ[7:0]. The dummy data r0, r1, r2, and r3 are data for swinging the levels of the I/O signal lines DQ[7:0] between high and low levels. The dummy data r0, r1, r2, and r3 are stored in the register 38 in advance.

An example of the dummy data r0, r1, r2, and r3 is data in which all bits of each are 0. That is, r0=0x00, r1=0x00, r2=0x00, and r3=0x00. Herein, "0x" represents a hexadecimal number.

Another example of the dummy data r0, r1, r2, and r3 is data in which all bits of each are 1. That is, r0=0xFF, r1=0xFF, r2=0xFF, and r3=0xFF.

Still another example of the dummy data r0, r1, r2, and r3 is data in which data with all bits 1, data with all bits 0, data with all bits 1, and data with all bits 0 appear in this order. That is, r0=0xFF, r1=0x00, r2=0xFF, and r3=0x00.

Still another example of the dummy data r0, r1, r2, and r3 is data in which data with all bits 0, data with all bits 1, data with all bits 0, and data with all bits 1 appear in this order. That is, r0=0x00, r1=0xFF, r2=0x00, and r3=0xFF.

Still another example of the dummy data r0, r1, r2, and r3 is data in which each even-numbered bit is 1 and each odd-numbered bit is 0. That is, r0=0x55, r1=0x55, r2=0x55, and r3=0x55.

Still another example of the dummy data r0, r1, r2, and r3 is data in which each even-numbered bit is 0 and each odd-numbered bit is 1. That is, r0=0xAA, r1=0xAA, r2=0xAA, and r3=0xAA.

Still another example of the dummy data r0, r1, r2, and r3 is data in which data with even-numbered bit of 1 and odd-numbered bit of 0, data with even-numbered bit of 0 and odd-numbered bit of 1, data with even-numbered bit of 1 and odd-numbered bit of 0, and data with even-numbered bit of 0 and odd-numbered bit of 1 appear in this order. That is, r0=0x55, r1=0xAA, r2=0x55, and r3=0xAA.

Still another example of the dummy data r0, r1, r2, and r3 is data in which data with even-numbered bit of 0 and odd-numbered bit of 1, data with even-numbered bit of 1 and odd-numbered bit of 0, data with even-numbered bit of 0 and odd-numbered bit of 1, and data with even-numbered bit of 1 and odd-numbered bit of 0 appear in this order. That is, r0=0xAA, r1=0x55, r2=0xAA, and r3=0x55.

As described with reference to FIG. 3, after transmitting the address, the NAND I/F circuit 32 deasserts the address latch enable signal ALE and, after that, maintains the data strobe signal DQS at a low level. The NAND I/F circuit 32 maintains the data strobe signal DQS at a low level, and after the write preamble period $t_{WPRE}$ has elapsed, the toggling of the data strobe signal DQS is started. The NAND I/F circuit 32 according to the embodiment transmits the dummy data r0 to r3 by using the I/O signal lines DQ[7:0] during the write preamble period t WPRE.

The NAND I/F circuit 32 transmits the write data d0 following the dummy data r3 by using the I/O signal lines DQ[7:0]. The NAND I/F circuit 32 transmits the write data d0, d1 . . . in synchronization with the toggling of the data strobe signal DQS.

As the NAND I/F circuit 32 transmits the dummy data r0, the power supply voltage VCCQ drops. After that, while the NAND I/F circuit 32 transmits the dummy data r1, r2, and r3 to swing the levels of the I/O signal lines DQ[7:0], the power supply voltage VCCQ gradually rises.

The size of the dummy data is not limited to 4 bytes and may be set to another number of bytes. A pulse width of the dummy data and a pulse width of the write data need not be equal. A plurality of the pulse widths of the dummy data may be different. An amplitude of the dummy data and an amplitude of the write data need not be equal. A plurality of the amplitudes of the dummy data may be different. A plurality of the dummy data need not be transmitted consecutively. A plurality of the dummy data may be transmitted discretely. It is not necessary to transmit the last dummy data r3 and the first write data d0 consecutively. There may be a no-signal period between the last dummy data r3 and the first write data d0. For example, the NAND I/F circuit 32 may set the I/O signal lines DQ[7:0] to a Hi-Z state from the transmission of the last dummy data r3 to the transmission of the first write data d0. A transmission mode including bit configuration, size, pulse width, amplitude, and transmission timing of the dummy data is set freely as long as the power supply voltage VCCQ can return to the level before the transmission of the dummy data r0, by the time that the first write data d0 is transmitted.

By transmitting the dummy data, when the NAND I/F circuit 32 transmits the write data d0, d1 . . . to the NAND chip 42 by using the I/O signal lines DQ[7:0], the power supply voltage VCCQ is in a stabilized state. The NAND I/F circuit 32 can output high-quality write data to the I/O signal line DQ[7:0] and can transmit a high-quality data strobe signal DQS to the data strobe signal line DQS. Therefore, the data strobe signal DQS and the write data can be input to the latch 144 at the same timing, and the latch 144 can correctly fetch the write data.

The operation of the NAND I/F circuit 32 illustrated in FIGS. 9A to 9C may be applied regardless of whether the interface between the memory controller 20 and the NAND flash memory 40 is the matched DQS type toggle interface or the unmatched DQS type interface.

According to the first embodiment, even if the power supply voltage fluctuates, the NAND I/F circuit 32 can transmit high-quality data strobe signals and write data, and the latch 144 can fetch correct write data.

Second Embodiment

Hereinafter, other embodiments will be described. Such other embodiments relate to modifications in the operation of the NAND I/F circuit 32. The configuration of the memory system according to the other embodiments is the same as that of the first embodiment.

Figure 10A:
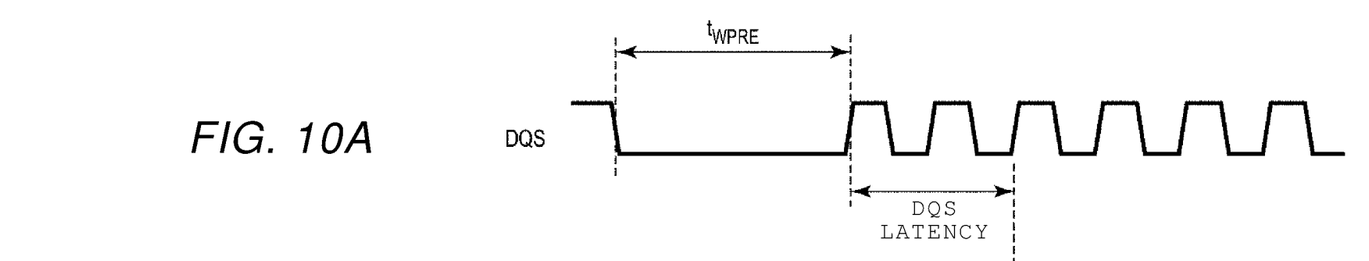
FIGS. 10A to 10C are diagrams illustrating an example of the operation of a NAND interface circuit according to a second embodiment.
Figure 10B:
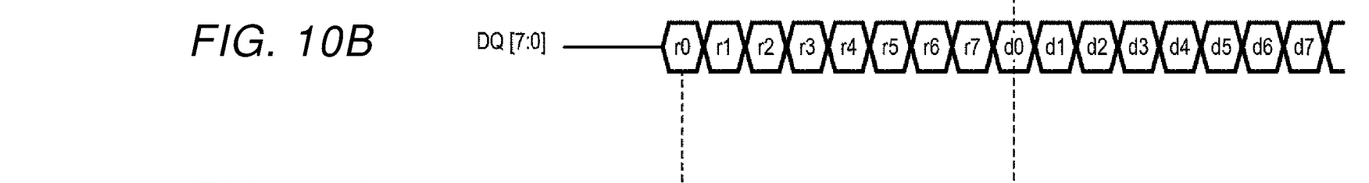
Figure 10C:
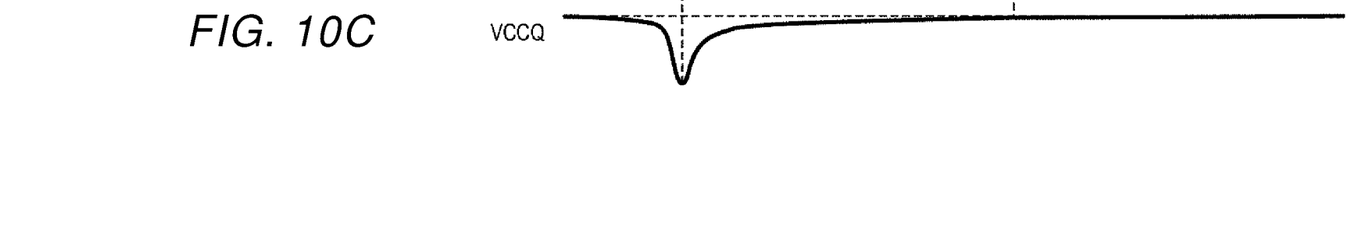
Figure 11A:
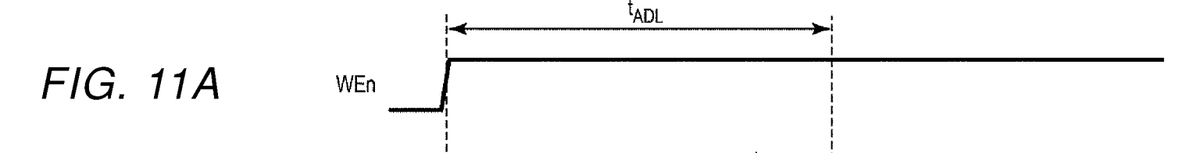
FIGS. 11A to 11D are diagrams illustrating an example of the operation of a NAND interface circuit according to a third embodiment.
Figure 11B:
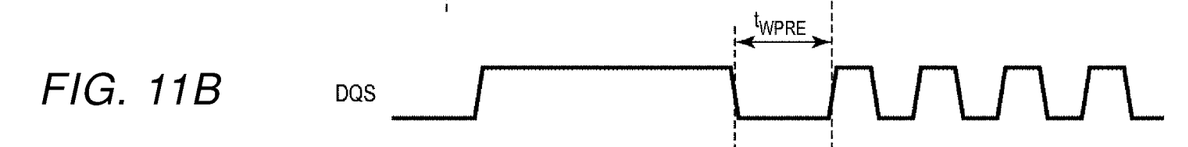
Figure 11C:
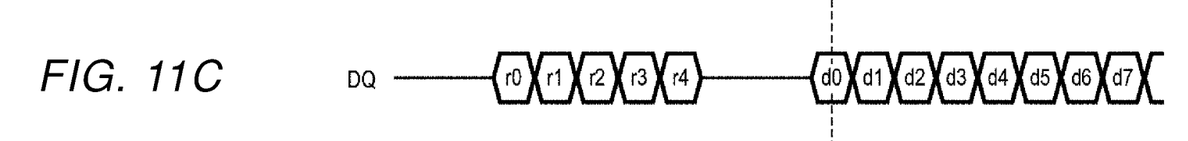
Figure 11D:
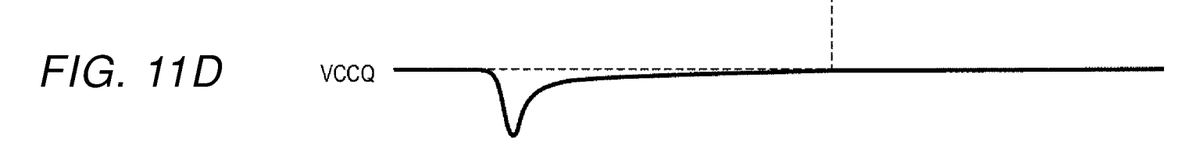

FIGS. 10A to 10C are diagrams illustrating an example of the operation of the NAND I/F circuit 32 according to the second embodiment. The NAND I/F circuit 32 according to the second embodiment toggles the data strobe signal DQS during a DQS latency period.

Inter-symbol interference may occur in each of the input receivers 140 and 150. That is, after the same data value is continuously input to each of the input receivers 140 and 150, if the data value changes, a waveform of a signal corresponding to the changed value may deteriorate. In particular, the waveform of the data strobe signal DQS may deteriorate in the input receiver 150. As described in the first embodiment, in the first toggle of the data strobe signal DQS, there is a possibility that the NAND I/F circuit 32 may not be able to raise (or lower) the amplitude to a predetermined voltage due to an ohmic drop. Accordingly, the latch 144 may not be able to correctly acquire the data strobe signal DQS input to the clock terminal.

The NAND I/F circuit 32 according to the second embodiment toggles the data strobe signal DQS during the DQS latency period before the transmission timing of the write data d0. The NAND I/F circuit 32 transmits the dummy data r0 to r3 by using the I/O signal lines DQ[7:0] during the write preamble period $t_{WPRE}$ before the DQS latency period. Accordingly, the NAND I/F circuit 32 can raise (or lower) the amplitude of the data strobe signal DQS to a predetermined voltage at the first toggle in the DQS latency period. The latch 144 can correctly acquire the data strobe signal DQS input to the clock terminal. Therefore, for example, the possibility is reduced that the latch 144 cannot acquire an expected number of the data strobe signals DQS, which are expected to be input during the DQS latency period. The expected number of the data strobe signals DQS is determined in advance, for example, in an interface specification between the memory controller 20 and the NAND flash memory 40.

Before transmitting the write data d0, d1, . . . to the NAND chip 42 by using the I/O signal lines DQ[7:0], the NAND I/F circuit 32 transmits the dummy data r0 to r7 to the NAND chip 42 by using the I/O signal lines DQ[7:0]. The dummy data r0 to r7 are data for swinging the levels of the I/O signal lines DQ[7:0] between high and low levels. The dummy data r0 to r7 are stored in the register 38 in advance.

The NAND I/F circuit 32 transmits the dummy data r0 to r3 while the data strobe signal DQS is maintained at a low level, and transmits the dummy data r4 to r7 in synchronization with the toggling of the data strobe signal DQS. The period during which the dummy data r4 to r7 are transmitted in synchronization with the toggling of the data strobe signal DQS is the DQS latency period.

The NAND I/F circuit 32 transmits the write data d0 following the dummy data r7. The NAND I/F circuit 32 transmits the write data d0, d1 . . . in synchronization with the toggling of the data strobe signal DQS.

As such, the NAND I/F circuit 32 transmits the dummy data by using the I/O signal lines DQ[7:0] before start of the DQS latency period. Accordingly, the power supply voltage VCCQ is in a stabilized state at the start timing of the DQS latency period. Therefore, the NAND I/F circuit 32 can raise (or lower) the amplitude of the data strobe signal DQS transmitted first in the DQS latency period to a predetermined voltage. As in the first embodiment, when the NAND I/F circuit 32 transmits the write data d0, d1 . . . to the NAND chip 42 by using the I/O signal lines DQ[7:0], the power supply voltage VCCQ is in a stabilized state. Accordingly, the NAND I/F circuit 32 can output high-quality write data to the I/O signal lines DQ[7:0].

Also in the second embodiment, the transmission mode of the dummy data is set as long as the power supply voltage VCCQ can return to the level before the transmission of the dummy data r0, by the start timing of the DQS latency period.

In the second embodiment, the toggling cycle of the data strobe signal DQS during the DQS latency period is equal to the toggling cycle of the data strobe signal DQS during a write data output period, but the present disclosure is not limited thereto. For example, the toggling cycle of the data strobe signal DQS during the DQS latency period may be different from the toggling cycle of the data strobe signal DQS during the write data output period. That is, pulse widths of the dummy data r4 to r7 may be different from pulse widths of the write data d0, d1, . . . .

The toggling cycle of the data strobe signal DQS in the DQS latency period may not be constant but may be varied.

For example, the toggling cycle of the data strobe signal DQS in the DQS latency period may be long first, gradually shortened, and finally equal to the toggling cycle of the data strobe signal DQS in the write data output period. When the toggling cycle of the data strobe signal DQS is long, the time required for the amplitude of the data strobe signal DQS to rise (or fall) to a predetermined voltage is shortened. Accordingly, the amplitude of the data strobe signal DQS is expected to rise (or fall) to a predetermined voltage at the first toggle in the write data output period.

In addition to the variation in the toggling cycle of the data strobe signal line DQS, the transmission cycle of the dummy data and the write data may also be varied. For example, the transmission cycle of the dummy data r0 to r3 may be set to 3p, the transmission cycle of the dummy data r4 to r7 may be set to 2p, and the transmission cycle of the write data d0, d1 . . . may be set to p.

Third Embodiment

The NAND I/F circuits 32 according to the first and second embodiments transmit the dummy data during the write preamble period $t_{WPRE}$ immediately before the transmission of the write data d0. The transmission timing of the dummy data r0 is not limited thereto, and may be before the period $t_{WPRE}$. FIGS. 11A to 11D are diagrams illustrating an example of the operation of the NAND I/F circuit 32 according to the third embodiment.

As described with reference to FIG. 3, after transmitting the address, the NAND I/F circuit 32 maintains the write enable signal WEn and the data strobe signal DQS at a high level. The NAND I/F circuit 32 according to the third embodiment outputs the dummy data r0 to r4 to the I/O signal lines DQ[7:0] while maintaining the write enable signal WEn and the data strobe signal DQS at the high level.

After outputting the dummy data r4, the NAND I/F circuit 32 maintains the data strobe signal DQS at a low level.

After maintaining the data strobe signal DQS at the low level during the write preamble period $t_{WRPE}$, the NAND I/F circuit 32 starts toggling the data strobe signal DQS. The NAND I/F circuit 32 outputs the write data d0, d1 . . . to the I/O signal lines DQ[7:0] in synchronization with the toggling of the data strobe signal DQS.

Also in the third embodiment, the transmission mode of the dummy data can be set as long as the power supply voltage VCCQ can return to the level before the transmission of the dummy data r0, by the time the first write data d0 is transmitted.

The NAND I/F circuit 32 according to the third embodiment outputs the dummy data to the I/O signal lines DQ[7:0] immediately after the transmission of the address. Accordingly, the power supply voltage VCCQ can be stabilized earlier than in the first and second embodiments.

Modified Example

The dummy data stored in the register 38 may be any pattern that facilitates the swinging of the I/O signal lines DQ[7:0]. For example, the dummy data r0 may be data with the largest value among the dummy data r0 to r3 (or r0 to r7), and a value thereof may be lowered along the dummy data r1, r2, . . . .

The dummy data is data causing the I/O signal lines DQ[7:0] to swing to compensate for the drop in the power supply voltage VCCQ due to the output of the I/O signal lines DQ[7:0], and there is a possibility that the amount of decrease in the power supply voltage VCCQ is likely to fluctuate with temperature. Accordingly, the dummy data may be changed based on the temperature.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
   a nonvolatile memory; and
   a controller electrically connected to the nonvolatile memory with at least first and second signal lines, and configured to:
   after transmitting a write command and an address to the nonvolatile memory via the first signal line, transmit dummy data to the nonvolatile memory via the first signal line during at least a portion of a period that is between when the address is transmitted via the first signal line and when write data of the write command is transmitted via the first signal line, and
   after transmitting the dummy data via the first signal line, transmit a data strobe signal to the nonvolatile memory via the second signal line and transmit the write data of the write command to the nonvolatile memory via the first signal line in synchronization with the data strobe signal,
   wherein the controller is configured to transmit a first portion of the dummy data to the nonvolatile memory via the first signal line while the data strobe signal is maintained at a low level, and transmit a second portion of the dummy data to the nonvolatile memory via the first signal line in synchronization with the toggling of the data strobe signal.

2. The memory system according to claim 1, wherein the controller is configured to start toggling the data strobe signal after transmitting the dummy data, and transmit the write data to the nonvolatile memory via the first signal line in synchronization with the toggling of the data strobe signal.

3. The memory system according to claim 1, wherein the controller is configured to transmit the address to the nonvolatile memory via the first signal line while an address latch enable signal is asserted, deassert the address latch enable signal after transmitting the address, transmit the first portion of the dummy data to the nonvolatile memory via the first signal line after deasserting the address latch enable signal while the data strobe signal is maintained at a low level, and toggle the data strobe signal during transmission of the second portion of the dummy data.

4. A memory system comprising:
   a nonvolatile memory; and
   a controller electrically connected to the nonvolatile memory with at least first and second signal lines, and configured to:
   after transmitting a write command and an address to the nonvolatile memory via the first signal line, transmit dummy data to the nonvolatile memory via the first signal line during at least a portion of a period that is between when the address is transmitted via the first signal line and when write data of the write command is transmitted via the first signal line, and
   after transmitting the dummy data via the first signal line, transmit a data strobe signal to the nonvolatile memory via the second signal line and transmit the write data of the write command to the nonvolatile memory via the first signal line in synchronization with the data strobe signal,
   wherein the controller is configured to transmit the dummy data to the nonvolatile memory via the first signal line while the data strobe signal is maintained at a high level, maintain the data strobe signal at a low level for a predetermined period of time after completely transmitting the dummy data, start toggling the data strobe signal after the predetermined period of time has elapsed, and transmit the write data to the nonvolatile memory via the first signal line in synchronization with the toggling of the data strobe signal.

5. The memory system according to claim 1, wherein the dummy data includes first dummy data and second dummy data following the first dummy data,
   the first dummy data is data in which all bits have a first value, and
   the second dummy data is data in which all bits have a second value different from the first value.

6. The memory system according to claim 1, wherein the dummy data includes first dummy data and second dummy data following the first dummy data,
   the first dummy data is data in which even-numbered bits have a first value and odd-numbered bits have a second value different from the first value, and
   the second dummy data is data in which even-numbered bits have the second value and odd-numbered bits have the first value.

7. A memory system comprising:
   a nonvolatile memory; and
   a controller electrically connected to the nonvolatile memory with at least first and second signal lines, and configured to:
   after transmitting a write command and an address to the nonvolatile memory via the first signal line, transmit dummy data to the nonvolatile memory via the first signal line during at least a portion of a period that is between when the address is transmitted via the first signal line and when write data of the write command is transmitted via the first signal line, and
   after transmitting the dummy data via the first signal line, transmit a data strobe signal to the nonvolatile memory via the second signal line, and transmit the write data of the write command to the nonvolatile memory via the first signal line in synchronization with rising and falling edges of the data strobe signal,
   wherein the controller is configured to transmit a first portion of the dummy data to the nonvolatile memory via the first signal line while the data strobe signal is maintained at a low level, and transmit a second portion of the dummy data to the nonvolatile memory via the first signal line in synchronization with the rising and falling edges of the data strobe signal.

8. The memory system according to claim 7, wherein the controller is configured to start toggling the data strobe signal after transmitting the dummy data, and transmit the write data to the nonvolatile memory via the first signal line in synchronization with the rising and falling edges of the data strobe signal.

9. The memory system according to claim 7, wherein the controller is configured to transmit the address to the nonvolatile memory via the first signal line while an address latch enable signal is asserted, deassert the address latch enable signal after transmitting the address, transmit the first portion of the dummy data to the nonvolatile memory via the first signal line after deasserting the address latch enable signal while the data strobe signal is maintained at a low level, and toggle the data strobe signal during transmission of the second portion of the dummy data.

10. The memory system according to claim 7, wherein
the dummy data includes first dummy data and second dummy data following the first dummy data,
the first dummy data is data in which all bits have a first value, and
the second dummy data is data in which all bits have a second value different from the first value.

11. The memory system according to claim 7, wherein
the dummy data includes first dummy data and second dummy data following the first dummy data,
the first dummy data is data in which even-numbered bits have a first value and odd-numbered bits have a second value different from the first value, and
the second dummy data is data in which even-numbered bits have the second value and odd-numbered bits have the first value.

* * * * *